May 13, 1947. F. H. FRISTOE 2,420,307
PORTABLE LAMP
Filed Feb. 8, 1944
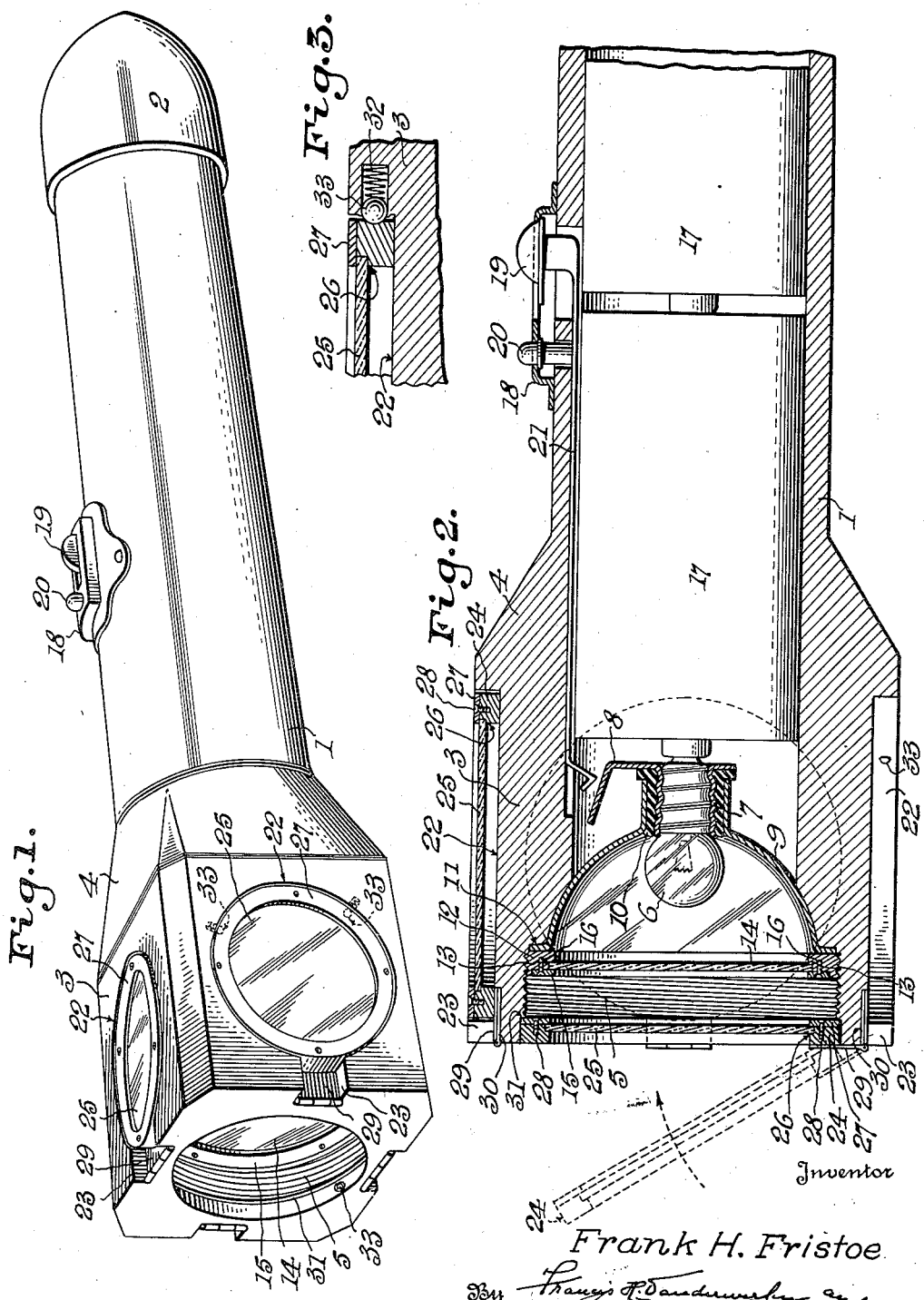
Inventor
Frank H. Fristoe
Attorneys Patented May 13, 1947

2,420,307

UNITED STATES PATENT OFFICE 2,420,307

PORTABLE LAMP

Frank H. Fristoe, United States Army

Application February 8, 1944, Serial No. 521,525

6 Claims. (Cl. 177—329)

(Granted under the act of March 3, 1883, as amended April 30, 1928; 370 O. G. 757)

The invention described herein may be manufactured and used by or for the Government for governmental purposes, without payment to me of any royalty thereon.

This invention relates to portable lamps and more particularly to flashlamps adapted to transmit either white or colored light.

Flashlamps have been utilized for transmitting white or colored light for various purposes but among these lamps there is none which is entirely satisfactory. All such lamps have been too fragile for use by troops in field operations owing to their complexity and lightness of construction. This invention contemplates a standard flashlamp comprising a battery casing, batteries, an incandescent lamp and a reflector, having a plurality of colored light transmitting members incorporated in the flashlamp in such a manner as not to be easily subject to wear and breakage.

It is an object of this invention to provide a new and improved portable flashlamp adapted to transmit either white or colored light constructed so as to be resistant to wear and not easily subject to breakage.

Another object of this invention is to provide a flashlamp adapted to transmit either white or colored light for sending either warning signals or code messages.

Still another object of this invention is to provide a flashlamp adapted to transmit either white or colored light which is simply constructed and inexpensive to manufacture.

A further object of this invention is to provide a flashlamp having an enlarged polygonal head containing recesses adapted to receive colored light transmitting members which may be individually and selectively positioned over the colorless lens of the flashlamp.

Other objects will be apparent from the following description of the invention and the accompanying drawing in which:

Figure 1 is a perspective view of the flashlamp showing the colored light transmitting members retracted in the recesses provided in the head of the flashlamp;

Figure 2 is a fragmentary side elevational view in cross section showing the flashlamp with a colored light transmitting member positioned in front of the colorless lens of the flashlamp and in dotted lines the member being swung into position; and Figure 3 is a fragmentary view in cross section of the retaining means adapted to hold the colored light transmitting members in the recesses provided in the head of the flashlamp.

Referring to the drawing, the flashlamp comprises a casing 1 having a cap 2 at one end and an enlarged polygonal head 3 joined to the other end of the casing 1 by the flared portion 4. The casing 1 and the head 3 may be formed of a plastic, light metal or other suitable material. The end of the head 3 is provided with an interiorly threaded opening 5 through which light from the bulb 6 passes. The bulb 6 is retained in a socket 7 having an electrical contact 8 formed thereon. The socket 7 is in turn supported by a parabolic reflector 9 which is insulated therefrom by a fibre or rubber sleeve 10. The reflector 9 is positioned within the head 3 on a shoulder 11 formed therein. An annular lens frame 12 provided with external screw threads adapted to engage the threaded portion of the head 3 in the opening 5 holds the reflector 9 in position within the head 3. The annular lens frame 12 has a shoulder 13 formed in the inner edge thereof which is adapted to support a transparent lens 14. The lens 14 is held in the frame 12 by an annular plate 15 which is secured to the frame 12 with screws 16. The casing 1 holds a plurality of batteries 17 which are forced together and in contact with the base of the bulb 6 by a standard spring element, not illustrated, which is mounted in the cap 2. A housing 18 riveted to the casing 1 contains a sliding switch 19 and a push button switch 20. A contact member 21 is attached to the sliding switch 19 and is positioned in the casing 1 so that it will engage the contact 8 either upon being moved forward by the sliding switch 19 or downward by pressure exerted upon the push button switch 20. When the contacts 8 and 21 are engaged the electrical circuit which includes the casing 1 is closed causing the bulb 6 to light. If the casing 1 is formed of a non-conducting plastic, additional conductors are provided to enable the switches 19 and 20 to complete the circuit.

The sides of the polygonal head 3 are provided with the recesses 22 and the slots 23 which extend from the recesses 22 to the end of the head 3. The recesses 22 are adapted to receive the annular lens frames 24 which support the colored light transmitting lenses 25. The lenses 25 are supported upon the shoulders 26 which are formed in the inner edges of each of the lens frames 24. The lenses 25 are secured in the frames 24 by the annular plates 27 which are fastened to the frames 24 by the screws 28. The slots 23 are adapted to receive the hinge members 29 and 30 which are secured to the frames 24 and the head 3, respectively. The recesses 22 are adapted to hold the frames 24 so that the latter members are flush with the sides of the head 3 and not exposed to wear and possible damage. Each of the lens frames 24 may be individually withdrawn from a recess 22 and pivotally moved by means of the hinge members 29 and 30 into the opening 5 in the end of the head 3 as shown by the dotted lines in Figure 2. The head 3 has a shoulder 31 formed within the opening 5 which serves as a stop and support to prevent further pivotal movement of the frame 24 within the opening 5. The side walls of the recesses 22 and the opening 5 have openings therein which are adapted to receive spring members 32 and balls 33. The spring pressed balls 33 retain the lens frames 24 in either the recesses 22 or the opening 5 when they are positioned therein. If the casing 1 and the head 3 are formed of a plastic material the spring pressed balls 33 may be replaced by pins or similar retaining means molded in the body of the head 3.

The flashlamp may thus be arranged with the lens frames 24 and the colored lenses 25 in the recesses 22 and used to project white light. Any standard means employed in the art for focusing the light from the bulb 6 may be incorporated in the flashlamp. If it is desired to employ the flashlamp as a warning signal, one of the colored lenses 25 supported by a frame 24 may be withdrawn from its recess 22 in the head 3 and pivotally moved to a position in the opening 5 whereby only the colored light from the bulb 6 will be transmitted by the flashlamp. The light may be projected continuously or intermittently by using either the sliding switch 19 or the push button switch 20. Alternatively, the colored lenses 25 in the lens frames 24 may be selectively positioned in the opening 5 and a series of colored lights transmitted in a predetermined sequence to send messages. The lens frames 24 when positioned in either the recesses 22 or the opening 5 are flush with respect to the head 3 and are not exposed so as to be subject to wear and damage. It is apparent that many different embodiments of this invention may be made without departing from the spirit and scope and therefore it is not intended to be limited except as indicated in the appended claims.

Having thus described my invention, what I claim as new and wish to secure by Letters Patent is:

1. A flashlamp adapted to transmit either white or colored light comprising a casing, an enlarged head at one end of said casing, said head being provided with an opening in the end thereof and a plurality of recesses in the sides thereof, means for projecting normally white light through said opening and a plurality of different colored light transmitting means pivotally mounted on said head, said recesses being adapted to receive said different colored light transmitting means and said different colored light transmitting means being adapted to be individually and selectively positioned in either one of said recesses or the opening in said head.

2. A flashlamp in accordance with claim 1 characterized in that the different colored light transmitting means comprises a frame and a colored lens supported therein.

3. A flashlamp in accordance with claim 1 characterized in that the portion of the head forming the opening therein is provided with a shoulder adapted to function as a stop and prevent inward movement of the different colored light transmitting means within said opening beyond the desired point.

4. A flashlamp in accordance with claim 1 characterized in that the side walls of said recesses and opening in said head are provided with means to retain said different colored light transmitting means in position therein.

5. A flashlamp adapted to transmit either white or colored light comprising a casing, an enlarged polygonal head formed at one end of said casing having an opening in the end thereof, said head being provided with a plurality of circular recesses in the sides thereof and slots extending from said recesses to the end of said head, means for projecting normally white light through said opening, a plurality of lens frames positioned in said recesses, different colored light transmitting lenses mounted in said frames and hinge members positioned in said slots and secured to said lens frames and said head whereby said lens frames may be individually and selectively positioned in either one of said recesses or the opening in said head.

6. A lamp structure adapted to transmit either white or different colored light comprising a casing having an opening therein, said casing being provided with a plurality of recesses in the surface thereof, means positioned in said casing for projecting normally white light through said opening and means associated with said casing and normally positioned in said recesses for transmitting different colored lights, said last named means being selectively and individually positioned in either one of said recesses or in said opening.

FRANK H. FRISTOE.

REFERENCES CITED

The following references are of record in the file of this patent:

UNITED STATES PATENTS

| Number | Name | Date |
|---|---|---|
| 1,291,493 | Hall | Jan. 14, 1919 |
| 1,613,203 | Shannon | Jan. 4, 1927 |
| 1,661,785 | Bruninga et al. | Mar. 6, 1928 |
| 2,070,472 | Criswell | Feb. 9, 1937 |
| 2,104,911 | Snyder | Jan. 11, 1938 |
| 2,119,486 | Muldoon | May 31, 1938 |
| 1,363,132 | Lander et al. | Dec. 21, 1920 |
| 1,600,067 | Retze | Sept. 14, 1926 |

FOREIGN PATENTS

| Number | Country | Date |
|---|---|---|
| 298,913 | Great Britain | July 4, 1929 |